Figure 1:
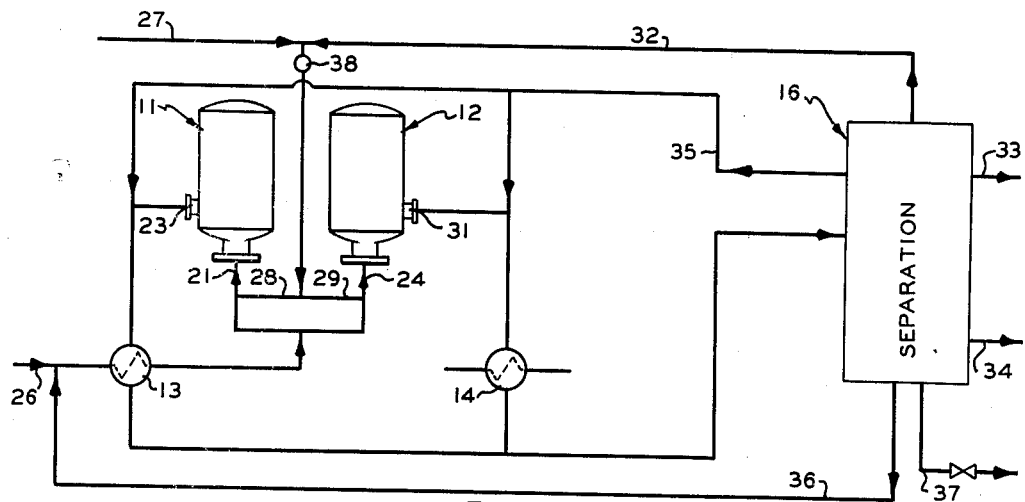

Aug. 17, 1965 F. T. SHERK ETAL 3,201,488

PROCESS AND APPARATUS FOR NON-CATALYTIC REACTION

Filed Dec. 22, 1961

INVENTORS
F.T. SHERK
R.E. DIXON
BY
ATTORNEYS

United States Patent Office 3,201,488
Patented Aug. 17, 1965

3,201,488
PROCESS AND APPARATUS FOR
NON-CATALYTIC REACTION
Fred T. Sherk and Rolland E. Dixon, both of Bartlesville,
Okla., assignors to Phillips Petroleum Company, a corporation of Delaware
Filed Dec. 22, 1961, Ser. No. 161,518
9 Claims. (Cl. 260—672)

This invention relates to non-catalytic chemical reactions. In one aspect the invention relates to process and apparatus for carrying out an exothermic chemical reaction including direct heat exchange within the reaction zone of reaction products with feed reactants and external, indirect heat exchange of reactant effluent with a feed stream. In another aspect the invention relates to a thermal, non-catalytic process utilizing a central, generally cylindrical zone and an annular zone surrounding the first zone and in which a portion of the reaction mixture from the second zone is circulated into the first zone utilizing energy derived from the feed stream to provide direct heat transfer within the reaction zone. In another aspect the invention relates to a reactor comprising a generally cylindrical outer shell containing a generally cylindrical baffle extending axially from one end of the shell and communicating with the space within the shell at both ends of the baffle, means for supplying a reactant to the space within the baffle and for utilizing the kinetic energy of the reactant to recirculate reaction products from the space outside the baffle into the space within the baffle, and means to remove an effluent stream from the space outside the baffle.

In the operation of thermal, exothermic, chemical reactions it is important to make efficient use of energy, to permit high reaction rates and at the same time to avoid extremely high temperatures. Among the factors involved in the efficient use of energy are the effective utilization of available heat and the minimization of the amount of material processed for given output. High reaction rate is necessary to avoid the high capital investment and increased maintenance costs of large capacity equipment. At the same time it is desirable to avoid extremely high temperatures and to localize necessary high temperature areas to avoid the use of extremely high cost materials in construction on the one hand, or short apparatus life on the other.

An important thermal, exothermic, chemical process is the thermal conversion of aromatic compounds to benzene, especially the dealkylation of alkyl derivatives of benzene, for example toluene.

An object of this invention is to provide an efficient, noncatalytic, exothermic process.

Another object is to provide an efficient thermal hydrodealkylation process.

Another object is to provide a thermal hydrodealkylation process having a high reaction rate with a controlled reaction zone effluent temperature.

Another object of this invention is to provide novel apparatus for carrying out efficient noncatalytic, exothermic, chemical processes.

Other aspects, objects and the advantages of our invention are apparent in the written description, the drawing and the claims.

According to our invention there is provided a thermal, noncatalytic, exothermic process which comprises recirculating a portion of the relatively hot reaction products to the feed stream within the reaction zone to provide internal, direct heat exchange and provide external, indirect heat exchange of the effluent stream from the reaction zone with the feed stream.

Further, according to our invention there is provided a thermal, noncatalytic, dealkylation process which comprises passing a sole feed stream comprising an alkylated aromatic hydrocarbon into a first central, unobstructed, generally cylindrical zone through one end, circulating the hydrocarbon through the first zone into a second zone which comprises an unobstructed annular zone surrounding the first zone, utilizing kinetic energy of the feed stream entering the first zone to recirculate a portion of the hydrocarbon from the second zone into the first zone, subjecting the hydrocarbon to dealkylation conditions of temperature and pressure, and removing a single outlet stream comprising a dealkylated component, the outlet stream being removed from the second zone.

Further, according to our invention there is provided a novel reactor comprising a generally cylindrical, elongated outer shell, a generally cylindrical baffle within the shell extending axially from one end of the shell and communicating directly with the space within the shell near one end of the shell and at a second location toward the other end of the shell, reactant inlet communicating with the space within the baffle adjacent the first location, reactant outlet communicating with the annular space surrounding the baffle and intermediate the ends thereof, and means in the baffle, in the reactor, utilizing the inlet feed energy to provide internal recycle through the annular space and the space within the baffle.

In the drawing, FIGURE 1 is a schematic, simplified flow diagram of a thermal hydrodealkylation process.

Figure 2:
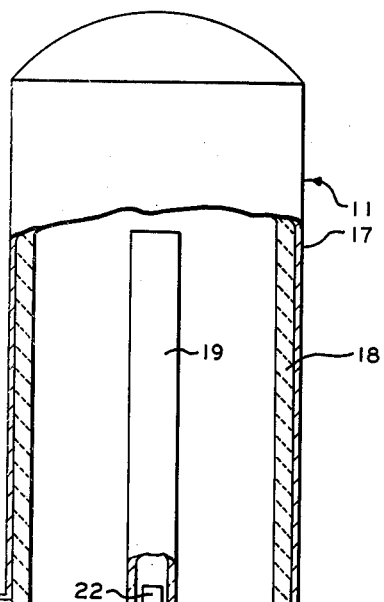

FIGURE 2 is a schematic elevation, partly of cross section, of our improved reactor.

In FIGURE 1 there are illustrated a pair of reactors 11 and 12, heat exchangers 13 and 14, and separation apparatus indicated generally at 16. This apparatus includes, for example, suitable fractionators, absorbers, etc. well known in the art. Heat exchanger 13 is provided for indirect heat exchange of the effluent from reactor 11 with the feed stream, while heat exchanger 14 is provided to cool the effluent stream from reactor 12 and, to conserve heat, the heated stream can be used to provide reboiler heat to one of the columns in separation apparatus 16. It is recognized, of course, that FIGURE 1 is schematic and greatly simplified and many necessary pieces of equipment, such as valves, pumps, controls, etc. necessary for an efficient commercial operation are not shown.

Reactor 11 is illustrated in somewhate more detail in FIGURE 2, although this illustration is also schematic and somewhat simplified. This reactor comprises a metal shell 17 having a suitable protective and insulating lining 18. Centrally positioned adjacent one end of reactor 11 is an internal chimney baffle 19. The reactant inlet line 21 terminates in a nozzle 22 positioned within chimney baffle 19. Both baffle 19 and nozzle 22 are preferably made of material, either ceramic or metallic, which will withstand high temperatures and is not catalytic for converting hydrocarbon to coke. Outlet 23 is provided near the inlet end of reactor 11 as shown.

In operation, a feed stream comprising toluene enters through line 26, is passed through heat exchanger 13 and fed to reactors 11 and 12 through inlets 21 and 24. A stream comprising hydrogen is fed through line 27 and through branch lines 28 and 29 to inlets 21 and 24, respectively. In each reactor the inlet stream comprising toluene and hydrogen is fed through the nozzle, discharging within the chimney baffle. Since the reaction is exothermic, as it proceeds, when the material flows upward in chimney 19 and then downward in the annular space surrounding it within the reactor shell, the temperature increases, a portion of the reaction product flows through the openings illustrated in the lower portion of chimney baffle 19 and is mixed with the incoming feed stream, thereby increasing the temperature of this stream more rapidly than would occur simply due to the reaction of that portion of feed. Therefore, the incoming reactants are raised to a relatively high temperature quickly, thereby increasing the rate of reaction. A product stream comprising benzene is removed through outlets 23 of reactor 11 and 31 of reactor 12. The effluent stream from reactor 11 is passed through heat exchanger 13 in indirect heat exchange with the incoming feed stream in line 26, thereby cooling the effluent and supplying heat to the feed stream. To cool the effluent from reactor 12, a cooler 14 is provided. This cooler, for conservation of heat, can be used to supply heat to a distillation column, for example the reboiler of a biphenyl separation column included within the separation apparatus 16. The combined effluent stream is fed to separation apparatus 16 wherein, as noted above, various absorbers, distillation columns, etc. are utilized to make the desired separations. A light stream containing hydrogen is removed through line 32 and can be used to supply hydrogen to line 27 as shown or can be removed for further use or treatment. A fuel gas stream comprising light hydrocarbons is removed through line 33. A product stream containing benzene is removed through line 34 while a quench stream, also containing benzene as well as lighter hydrocarbon, is removed through line 35 and fed to the effluent lines from both reactors to reduce the temperature of the effluent to a value at which the catalytic coking of these streams is minimized. Suitable streams containing unreacted toluene and heavier aromatic compounds, such as biphenyl, are returned from the separation steps to the feed line and this return is indicated schematically by line 36. Heavy constituents, not readily converted to benzene, such as condensed aromatics, for example naphthalene, are removed periodically through line 37.

In the process for converting toluene to benzene, the feed stream at inlets 21 and 24 is at a temperature in the range of 700 to 1200° F., preferably 900 to 1100° F., while the outlet streams are at a temperature in the range of 1300 to 1600° F., preferably 1400 to 1500° F. To avoid the catalytic coking of the material in the effluent lines due to contact with the metal pipes, it is preferable to quench the effluent to a temperature of not over 1000° F., preferably to a temperature in the range of 800 to 1000° F. Preferably, a heater 38 is provide to raise the temperature of the hydrogen-containing stream to a value sufficient to raise the entire stream to the inlet temperature. Although the temperature of the hydrocarbon feed in line 26 after passing through heat exchanger 13 preferably is high enough that the material is vaporized or is above the critical temperature, normally additional heat is supplied by the hydrogen-containing stream.

In an example of the operation of our invention, the reactor shell 17 is made of 2-inch carbon steel and is 17 feet high and has a diameter of 7.5 feet. Lining 18 is made of 6 inches of a dense, high alumina, low iron, refractory concrete backed up by 6 inches of a light weight, low iron, insulating, refractory concrete supported by stainless steel type 302B anchors extending into the dense concrete lining and located on about 9-inch centers. Chimney baffle 19 and nozzle 22 are made of silicon carbide refractory. Inlet pipe 21 is held in place by flange 20. A sleeve, also of silicon carbide refractory, is inserted to form the inner surface of outlet 23. The toluene feed in line 26 is 2120 barrels per day. The hydrogen feed stream in line 27 flows at the rate of 231 M c.f. per hour while that through line 32 is 740 M c.f. per hour, containing a large proportion of methane. The total reactor feed, divided between inlet 21 and inlet 24, is 1098 M c.f. per hour while the net reactor effluent divided between outlets 23 and 31 is 1080 M c.f. per hour. Quench liquid in the amount of 3100 barrels per day is added through line 35 and divided between the two effluent streams as shown, thus reducing the temperature to approximately 1000° F., the temperature of the stream leaving the reactors being 1400° F. The temperature of the effluent from reactor 11 is reduced to 800° F. in heat exchanger 13 while, at the same time, increasing the temperature of the feed in line 26 from 150° F. to 700° F. The temperature of the combined hydrogen feed in line 27 and line 32 is 175° F. In this instance the combined stream is passed in indirect heat exchange with the combined effluent stream in a heat exchanger (not shown) in which the temperature is raised to 650° F. prior to passing to heater 38. In heater 38 the temperature is further raised to 1370° F. The temperature of the combined feed stream at inlets 21 and 24 is 1150° F. A total of 377 barrels per day is recycled through line 36. Gas in the amount of 222 M c.f. per hour is removed through line 33 and 1482 barrels per day of the product stream removed through line 34. The composition of the various streams is given in Table I, wherein the column number refers to the corresponding pipe number in FIGURE 1.

*Table I*

| | Stream | | | | | | | | | | |
|---|---|---|---|---|---|---|---|---|---|---|---|
| | Toluene Feed | Fresh Hydrogen | Toluene To Vent Gas Absorber | Recycle Hydrogen | Total Hydrogen Stream | Total Reactor Feed | Net Reactor Effluent | Quench Liquid | Biphenyl Tower Feed | Biphenyl Tower OHP | Flash Tank Bottoms |
| Stream Number | 26 | 27 | | 32 | 28+29 | 21+24 | 23+31 | 35 | | | |
| Component: | | | | | | | | | | | |
| Hydrogen | | 561.4 | | 787.1 | 1,348.5 | 1,348.5 | 822.5 | 2.7 | 825.2 | 822.5 | 0.8 |
| Methane | | 15.2 | | 1,122.0 | 1,137.2 | 1,138.1 | 1,621.2 | 22.8 | 1,644.0 | 1,621.2 | 9.8 |
| Ethane | | 11.6 | | 30.0 | 41.6 | 42.1 | 90.9 | 4.7 | 95.6 | 90.9 | 4.0 |
| Propane | | 12.8 | | | 12.8 | 12.8 | | | | | |
| Butane | | 6.1 | | | 6.1 | 6.1 | | | | | |
| Pentane | | 2.4 | | | 2.4 | 2.4 | | | | | |
| Benzene | | | | 11.7 | 11.7 | 25.5 | 270.6 | 397.1 | 667.7 | 265.0 | 217.3 |
| Toluene | 233.4 | | 20.9 | .3 | .3 | 262.7 | 32.0 | 73.1 | 105.1 | 26.0 | 23.6 |
| Xylenes | 23.8 | | 2.1 | | | 27.9 | 4.2 | 2.4 | 6.6 | 2.6 | 2.5 |
| C₉ Aromatics | 1.8 | | 0.2 | | | 2.0 | 0.4 | 1.7 | 2.1 | 0.2 | 0.2 |
| Methylcyclohexane | 1.1 | | 0.1 | | | 1.1 | | | | | |
| Trimethylcyclopentane | 1.2 | | 0.1 | | | 1.2 | | | | | |
| Heptanes | 3.4 | | 0.3 | | | 3.4 | | | | | |
| Octanes | 14.3 | | 1.3 | | | 14.3 | | | | | |
| Biphenyl | | | | | | | 8.1 | 8.1 | 8.1 | | |
| Total, mols/hr | 279.0 | 609.5 | 25.0 | 1,951.1 | 2,560.6 | 2,896.2 | 2,849.9 | 504.5 | 3,354.4 | 2,828.4 | 258.2 |
| Total, b.p.s.d | 2,120 | | 188 | | | | | 3,100 | | | 1,590 |
| Total, M s.c.f.h | | 231 | | 740 | 970 | 1,098 | 1,080 | | 1,270 | 1,071 | |

Table 1—(Continued)

| Stream Number | Flash Tank Overhead | Lean Oil To Methane Absorber | Methane Absorber Bottoms | Bleed Liquid | Vent Gas 33 | Vent Gas Absorber Overhead | Vent Gas Absorber Bottoms | Stabilizer Gas | Stabilizer Bottoms | Recycle | Product 34 |
|---|---|---|---|---|---|---|---|---|---|---|---|
| Component: | | | | | | | | | | | |
| Hydrogen | 821.7 | 3.6 | 38.2 | | 34.6 | 34.6 | | 0.8 | | | |
| Methane | 1,610.5 | 228.1 | 718.0 | 0.4 | 489.0 | 488.1 | 0.9 | 10.2 | | | |
| Ethane | 86.4 | 244.8 | 301.7 | 0.4 | 56.5 | 56.0 | 0.5 | 4.4 | | | |
| Propane | | | | | | | | | | | |
| Butane | | | | | | | | | | | |
| Pentane | | | | | | | | | | | |
| Benzene | 47.7 | 16,437.6 | 16,473.6 | 28.3 | 7.7 | 0.1 | 7.6 | 0.3 | 245.3 | 6.2 | 244.7 |
| Toluene | 2.4 | 1,026.0 | 1,028.1 | 2.0 | .1 | 2.5 | 18.5 | | 25.5 | 31.4 | 0.2 |
| Xylenes | 0.1 | 59.4 | 59.5 | 0.1 | | 0.1 | 2.0 | | 2.6 | 4.2 | |
| C₉ Aromatics | | | | | | | 0.2 | | 0.2 | 0.4 | |
| Methylcyclohexane | | | | | | | 0.1 | | | | |
| Trimethylcyclopentane | | | | | | | 0.1 | | | | |
| Heptanes | | | | | | | 0.3 | | | | |
| Octanes | | | | | | 0.1 | 1.2 | | | | |
| Biphenyl | | | | | | | | | 8.1 | | |
| Total, mols/hr | 2,568.8 | 18,000.0 | 18,619.1 | 31.2 | 587.9 | 581.5 | 31.4 | 15.7 | 273.6 | 50.3 | 244.9 |
| Total, b.p.s.d | | 109,900 | 112,450 | 199 | | | | | 1,694 | 377 | 1,482 |
| Total, M s.c.f.h | 973 | | | | 222 | 220 | 244 | 6 | | | |

Although in FIGURE 2 the reactor 11 is illustrated with the inlet at the bottom thereof and the chimney baffle extending up from the bottom, this reactor can be operated in other positions, including inverted.

Reasonable variation and modification are possible within the scope of our invention which sets forth a process for carrying out a non-catalytic, exothermic chemical reaction including the steps of providing a direct heat exchange between reaction products and feed stream in the reaction zone and indirect heat exchange between the effluent from the reaction zone and the feed stream, a process for thermal non-catalytic reaction comprising direct heat exchange in the reaction zone, and novel reaction apparatus.

We claim:

1. A thermal, non-catalytic dealkylation process comprising the steps of passing a sole feed stream comprising an alkylated aromatic hydrocarbon into a first central, generally cylindrical zone through a first end thereof, circulating said hydrocarbon through said first zone and from a second end thereof into a second zone comprising an unobstructed annular zone surrounding said first zone and in open communication therewith at said first and second ends, utilizing kinetic energy of the flow of said feed stream entering said first zone to recirculate a portion of said hydrocarbon directly from said second zone into said first end of said first zone, subjecting said hydrocarbon to dealkylation conditions of temperature and pressure, and removing a single effluent stream comprising a dealkylated component, said effluent stream being removed from said second zone.

2. A process for carrying out a thermal exothermic chemical reaction wherein the feed stream and the reaction mixture can be contacted without substantial harmful effect which comprises passing the reactants in a sole feed stream into a first central, unobstructed, generally cylindrical zone through a first end thereof, circulating the reaction mixture through said first zone and from a second end thereof into a second zone and in open communication therewith at said first and second ends comprising an unobstructed annular zone surrounding said first zone, utilizing kinetic energy of the flow of said feed stream entering said first zone to recirculate a portion of said reaction mixture directly from said second zone into said first end of said first zone, thereby subjecting said reaction mixture to reaction conditions of temperature and pressure, and removing a single effluent stream comprising the product of the reaction, said effluent stream being removed from said second zone.

3. A process for carrying out a thermal exothermic chemical reaction wherein the feed stream and the reaction mixture can be contacted without substantial harmful effect which comprises passing the reactants in a sole feed stream into a first central, unobstructed, generally cylindrical zone through a first end thereof, circulating the reaction mixture through said first zone and from a second end thereof into a second zone comprising an unobstructed annular zone surrounding said first zone and in open communication therewith at said first and second ends, utilizing kinetic energy of the flow of said feed stream entering said first zone to recirculate a portion of said reaction mixture directly from said second zone into said first end of said first zone, thereby subjecting said reaction mixture to reaction conditions of temperature and pressure, removing a single effluent stream comprising the products of the reaction, said effluent stream being removed from said second zone, and passing said effluent stream in indirect heat exchange with said feed stream.

4. A thermal, noncatalytic, dealkylation process comprising the steps of passing a sole stream comprising toluene and hydrogen at a temperature in the range of 700 to 1200° F. into a first central, generally cylindrical zone through a first end thereof, circulating the reaction mixture through said first zone and from a second end thereof into a second zone comprising an unobstructed annular zone surrounding said first zone and in open communication therewith at said first and second ends utilizing kinetic energy of the flow of said feed stream entering said first zone to recirculate a portion of said reaction mixture directly from said second zone into said first end of said first zone thereby supplying heat to maintain dealkylation conditions of temperature and pressure, and removing a single effluent stream comprising benzene, said outlet stream being removed from said second zone and said effluent stream being at a temperature in the range of 1300 to 1600° F.

5. The process of claim 4 wherein said feed stream temperatures are in the range of 900 to 1100° F. and said effluent temperatures in the range of 1400 to 1500° F.

6. A thermal, non-catalytic, dealkylation process comprising the steps of passing a sole feed stream comprising toluene and hydrogen at a temperature in the range of 700 to 1200° F. into a first central, unobstructed, generally cylindrical zone through a first end thereof, circulating the reaction mixture through said first zone and from a second end thereof into a second zone comprising an unobstructed annular zone surrounding said first zone and in open communication therewith at said first and second ends, utilizing kinetic energy of the flow of said feed stream entering said first zone to recirculate a portion of said reaction mixture directly from said second zone into said first end of said first zone, thereby supplying heat to said feed stream to raise the temperature thereof and increase the reaction rate, maintaining dealkylation conditions of temperature and pressure in said first and said second zones, removing a single effluent stream, comprising benzene, at a temperature in the range of 1300 to 1600° F. from said second zone, passing said effluent stream in indirect heat exchange with said feed stream outside said reaction zone, passing said effluent stream to a separation zone and removing from said separation zone a hydrogen-containing stream, a fuel gas stream, a benzene-comprising stream, a stream comprising unconverted toluene and heavier aromatics, and returning said stream comprising hydrogen and said stream comprising toluene to said feed stream.

7. The process of claim 6 wherein said feed stream is at a temperature in the range of 900 to 1100° F. and said effluent stream is at a temperature in the range of 1400 to 1500° F.

8. A reactor apparatus comprising a reactor having a generally cylindrical, elongated outer shell, a generally cylindrical baffle within said shell extending axially from one end thereof and communicating directly with the interior of said shell through a first opening at a location near said one end of said shell and through a second opening at a second location toward the other end of said shell, said shell and said baffle together defining an annular chamber therebetween, said baffle and said annular chamber both being open and unobstructed between said first opening and said second opening, a single reactant inlet in open communication with the space within said baffle, and a single reactant outlet in open communication with said annular space surrounding said baffle intermediate the ends thereof, said reactant inlet, said baffle and said shell and said first opening, said second opening, and said reactant outlet being sized and positioned to cooperate to utilize inlet feed energy to provide internal recycle in said reactor through said annular space and the space within said baffle.

9. Non-catalytic reaction apparatus comprising a reactor having a generally cylindrical, elongated outer shell, a generally cylindrical baffle within said shell extending axially from one end thereof and communicating directly with the interior of said shell through a first opening at a location near said one end of said shell and through a second opening at a second location toward the other end of said shell, said shell and said baffle together defining an annular chamber therebetween, said baffle and said annular chamber both being open and unobstructed between said first opening and said second opening, a single reactant inlet in open communication with the space within said baffle, a single reactant outlet in open communication with said annular space surrounding said baffle intermediate the ends thereof, said reactant inlet, said baffle and said shell and said first opening, said second opening, and said reactant outlet being sized and positioned to cooperate to utilize inlet feed energy to provide internal recycle in said reactor through said annular space and the space within said baffle thereby providing direct heat exchange of the inlet reactants and the reaction products, means for providing indirect heat exchange of the effluent stream with the feed stream outside said reactor, separation means for the effluent stream, means to remove a reaction product from said separation means, and means to return unconverted reactant from said separation means to said feed inlet.

References Cited by the Examiner

UNITED STATES PATENTS

| | | | |
|---|---|---|---|
| 2,472,254 | 6/49 | Johnson | 260—668 |
| 2,629,684 | 2/53 | Leffer | 260—672 |
| 2,763,532 | 9/56 | McKinnis | 23—284 |
| 2,768,219 | 10/56 | Hoffmann et al. | 260—672 |
| 2,875,150 | 2/59 | Schuman | 208—107 |
| 2,885,337 | 5/59 | Keity et al. | 208—107 |
| 2,885,344 | 5/59 | Garbo | 208—107 |
| 2,917,451 | 12/59 | Leffer | 208—107 |
| 2,959,534 | 11/60 | Fogle | 208—107 |

ALPHONSO D. SULLIVAN, *Primary Examiner.*